United States Patent
Sweet et al.

(10) Patent No.: US 11,584,104 B2
(45) Date of Patent: Feb. 21, 2023

(54) SHIPLAP BONDING SYSTEM AND METHOD

(71) Applicant: WABASH NATIONAL, L.P., Lafayette, IN (US)

(72) Inventors: James A. Sweet, Lafayette, IN (US); Brandon M. Davenport, Amboy, IN (US)

(73) Assignee: Wabash National, L.P., Layfayette, IN (US)

(*) Notice: Subject to any disclaimer, the term of this patent is extended or adjusted under 35 U.S.C. 154(b) by 480 days.

(21) Appl. No.: 16/557,658

(22) Filed: Aug. 30, 2019

(65) Prior Publication Data
US 2020/0139663 A1    May 7, 2020

Related U.S. Application Data

(60) Provisional application No. 62/755,015, filed on Nov. 2, 2018.

(51) Int. Cl.
| | | |
|---|---|---|
| B62D 27/02 | (2006.01) | |
| B32B 1/02 | (2006.01) | |
| B32B 3/06 | (2006.01) | |
| B62D 33/04 | (2006.01) | |
| B32B 3/12 | (2006.01) | |
| B32B 3/18 | (2006.01) | |
| B62D 63/06 | (2006.01) | |

(52) U.S. Cl.
CPC .............. *B32B 3/06* (2013.01); *B32B 1/02* (2013.01); *B32B 3/12* (2013.01); *B32B 3/18* (2013.01); *B62D 27/02* (2013.01); *B62D 33/046* (2013.01); *B32B 2250/03* (2013.01); *B32B 2439/40* (2013.01); *B62D 63/06* (2013.01)

(58) Field of Classification Search
CPC ...... B62D 29/045; B62D 33/046; B32B 3/06; B65D 5/28
See application file for complete search history.

(56) References Cited

U.S. PATENT DOCUMENTS

| | | | | |
|---|---|---|---|---|
| 4,065,168 A | * | 12/1977 | Gregg ................... | B62D 33/04 296/186.1 |
| 4,107,892 A | * | 8/1978 | Bellem ..................... | E04B 1/54 52/396.04 |
| 2007/0014984 A1 | * | 1/2007 | Stout .......................... | C09J 7/38 428/353 |
| 2011/0284560 A1 | * | 11/2011 | Pattison ............. | B65D 90/0053 220/660 |

* cited by examiner

*Primary Examiner* — Andrew T Kirsch
(74) *Attorney, Agent, or Firm* — Quarles & Brady LLP

(57) ABSTRACT

Embodiments of the invention provide a storage container including a roof and two opposing side walls. At least one of the roof and the two side walls comprises a panel member including an inner skin, an outer skin, and a core between the inner skin and the outer skin. The panel member also including an inner skin trailing edge extending beyond the core and the outer skin and an outer skin leading edge, opposite the inner skin trailing edge, extending beyond the core and the inner skin. A viscoelastic tape is provided along the trailing edge and leading edge to maintain the position of the panel. Multiple panels can be joined with an adhesive material, with the viscoelastic tape maintaining the connection between the panels while the adhesive material sets and preventing the adhesive material from exiting past the trailing and leading edges.

18 Claims, 4 Drawing Sheets

SHIPLAP BONDING SYSTEM AND METHOD

CROSS-REFERENCE TO RELATED APPLICATION

This application claims priority under 35 U.S.C. § 119 to U.S. Provisional Patent Application No. 62/755,015 filed on Nov. 2, 2018, the entire contents of which are incorporated herein by reference.

BACKGROUND

Many storage containers, such as mobile storage containers for box or van-type trailers, include side walls and a roof assembly formed by multiple panel members coupled together. In particular, adjacent panel members are coupled together by joint configurations, such as shiplap joints, logistic joints, fastened joints, or others. Some joint configurations, however, do not provide substantially flush or smooth surfaces across joined panel members. As a result, an article being placed in the storage container or an article exterior to the storage container can be caught or snagged along a panel edge (i.e., at the joint). Additionally, while some joint configurations minimize edge snag for certain types of panel member structures, these configurations and methods cannot be utilized with other types of panel member structures.

SUMMARY

It is thus desirable to provide a joint configuration and method for joining panel members together that minimizes edge snag and can be used with multiple types of panel member structures for storage container walls, roofs, and/or doors.

Some embodiments of the invention provide a storage container including a roof and two opposing side walls. At least one of the roof and the two side walls comprises a first panel member with a first panel member length. The first panel member can include an inner skin, an outer skin, a core between the inner skin and the outer skin, an inner skin trailing edge extending beyond the core and the outer skin and extending along the first panel member length, and a first viscoelastic tape extending along a distal area of the inner skin trailing edge.

Some other embodiments of the invention provide a panel member of a storage container. The panel member can include a panel member length, an inner skin, an outer skin, a core between the inner skin and the outer skin. An inner skin trailing edge can extend beyond the core and the outer skin and can extend along the panel member length. A first viscoelastic tape can extend along a distal area of the inner skin trailing edge.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
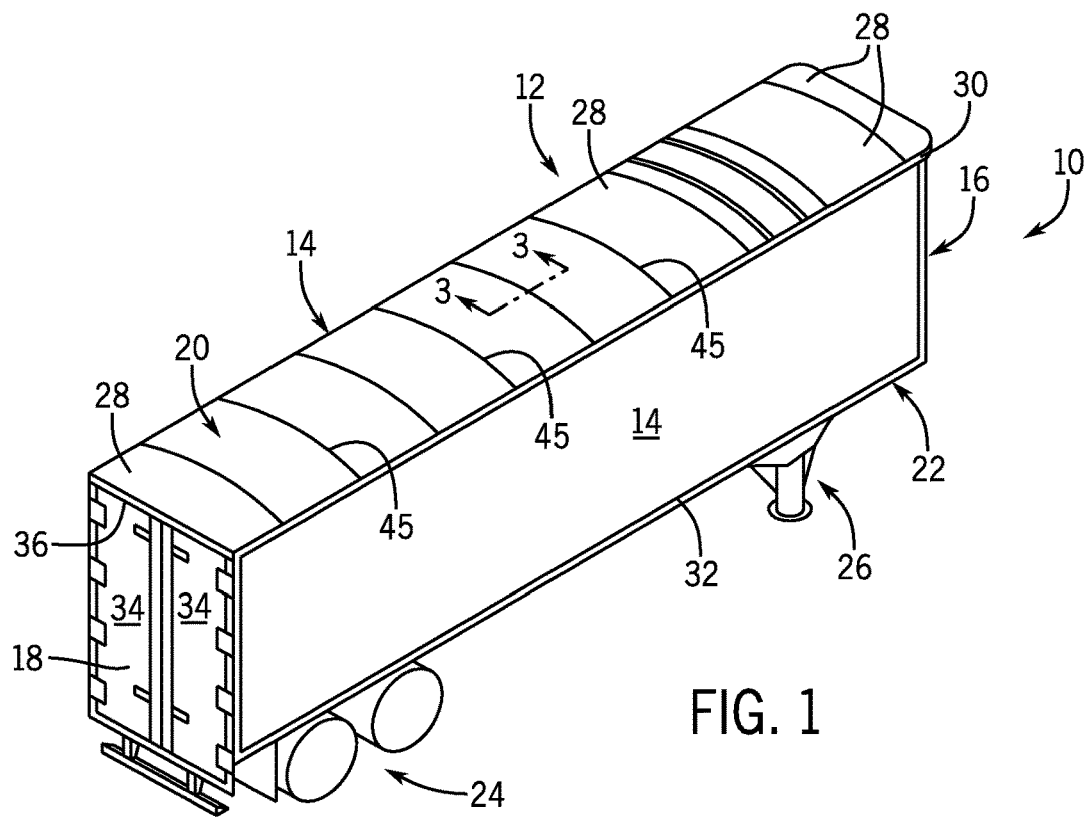
FIG. 1 is an isometric view of a trailer with a roof comprising a plurality of panel members.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage enclosures or containers, as well as refrigerated and un-refrigerated trailers, storage containers, or truck bodies that include wall and/or roof panels joined together.

As used herein, directional terms including "top," "bottom," "side," "horizontal," "vertical," and so on are used to indicate directional relationships with respect to an arbitrary reference frame (e.g., a reference frame of a particular figure or figures). These directional terms are used consistently relative to a particular embodiment. For example, a "top" feature of an embodiment is opposite a corresponding "bottom" feature, and a "horizontal" feature generally extends perpendicularly to a "vertical" feature. However, unless otherwise defined or limited, these directional terms are not intended to indicate an absolute reference frame for a particular assembly. For example, in some embodiments, a "horizontal" feature of a truck trailer, while generally perpendicular to a "vertical" feature of the truck trailer, may not necessarily extend in a strictly horizontal direction relative to ground.

As shown in FIG. 1, a trailer 10 includes a storage container 12 formed by a pair of opposing side walls 14, a front end wall 16, a rear end wall 18, a roof 20, and a floor assembly 22. The trailer 10 further includes a rear wheel assembly 24 and a front support or landing gear 26, which are each coupled to the floor assembly 22. According to some embodiments, the trailer 10 may be a conventional box or van type trailer. For example, the front end of the trailer 10 may be configured to be coupled to a tractor (not shown) for towing the trailer 10 thereon, thus providing a tractor-trailer assembly.

Illustratively, one or more of the roof 20 and/or walls 14, 16, 18 of the trailer 10 may be formed by a plurality of panel members 28. In particular, as shown in FIG. 1, the roof 20 may be formed from a plurality of separate panel members 28 coupled together. The panel members 28 are arranged in a side-by-side relationship atop the trailer 10 and extend along a length of the trailer 10. The panel members 28 may be joined to each other and also generally secured to the tops of side walls 14 (e.g., to a top rail 30). Additionally, the rear-most panel member 28 may be coupled to the top of the rear wall 18 and the forward-most panel member 28 may be coupled to the top of the front wall 16. The panel members 28 may be coupled to the top rail 30 and/or walls 14, 16, 18 via suitable joining members, such as rivets, threated nut/bolt combinations, studs, or the like, or via bonding media.

Figure 2:
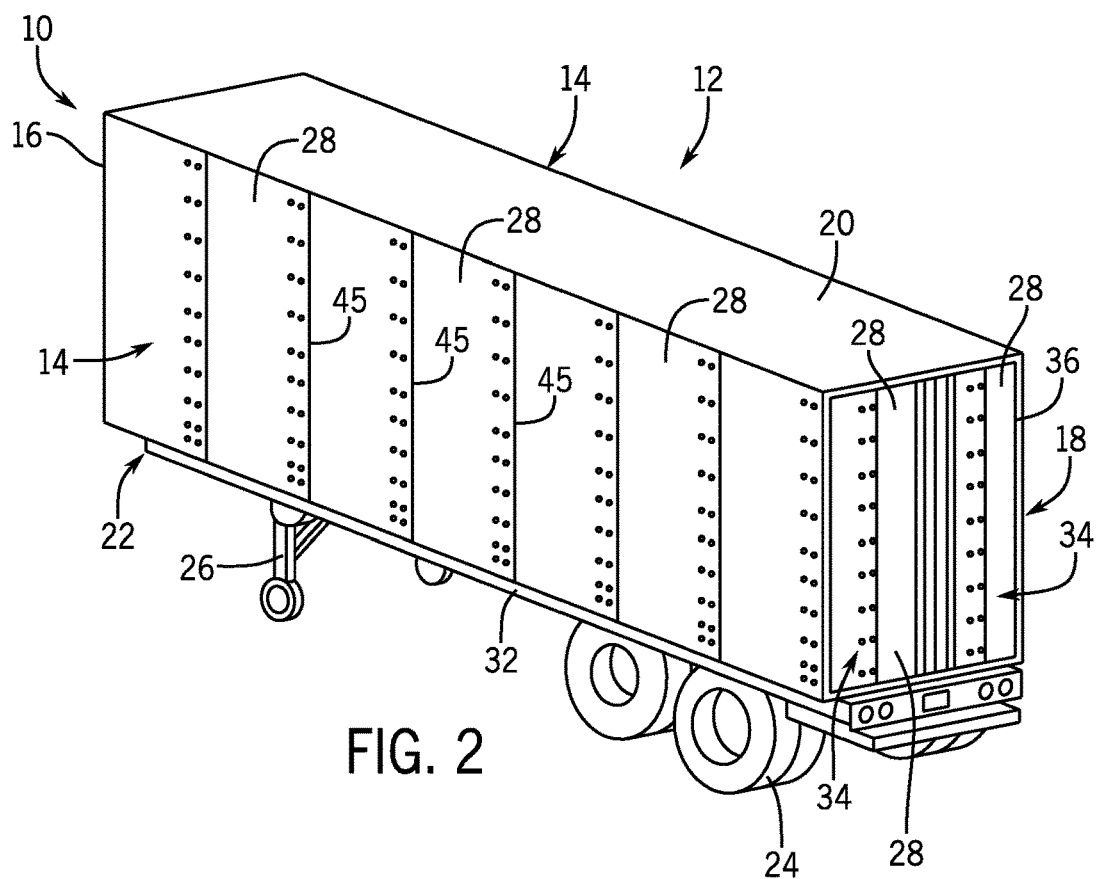
FIG. 2 is an isometric view of a trailer with side walls comprising a plurality of panel members.

Furthermore, as shown in the trailer 10 of FIG. 2, the side, front, and/or rear walls 14, 18, 16 may be formed by panel members 28 coupled together. For example, with respect to the side walls 14, the panel members 28 are arranged in a side-by-side relationship along a length of the trailer 10. The upper end of each panel member 28 may be connected to the roof 20 via the top rail 30 by suitable joining members, such as bolts, rivets, or studs, and the lower end of each panel member 28 may be connected to the floor 22 via a bottom rail 32 by suitable joining members, such as bolts, rivets, or studs. Additionally, the rear wall 18 may include rear cargo doors 34 formed from a plurality of panel members 28. For example, interior edges of the panel members 28 are joined together in a side-by-side relationship while exterior edges of the panel members 28 may be connected to a rear frame 36 by suitable joining members, such as bolts, rivets, or studs.

It should be noted that, while FIGS. 1 and 2 show the roof and walls, respectively, comprising panel members 28, it is within the scope of this disclosure to include trailers with both paneled walls and roofing or various combinations thereof. Additionally, while the panel members 28 are described with respect to box or van type trailers, it should be understood that the concepts described herein may be applicable to other trailer types and/or other storage containers.

Figure 3:
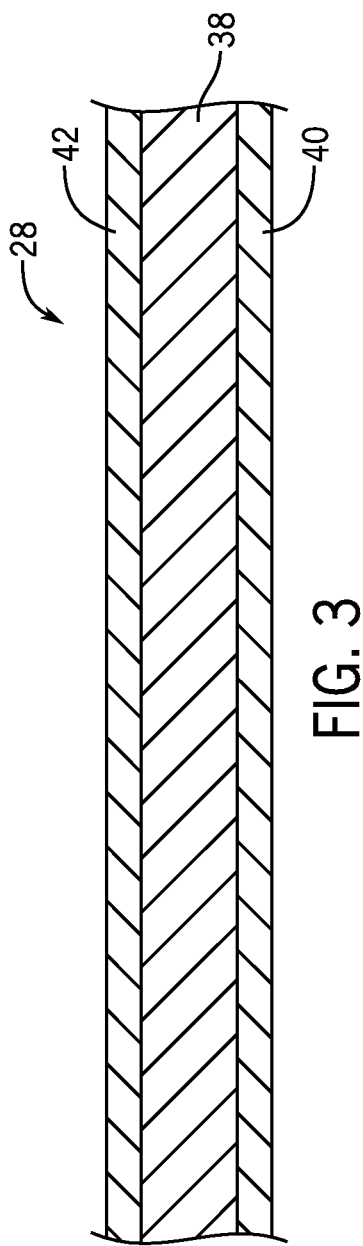
FIG. 3 is a cross-sectional view of a panel member as viewed along the section line 3-3 of FIG. 1.

The panel members 28 may be comprised of any number of suitable composite materials or non-composite materials (such as metals, metal alloys, and/or plastics, for example). For example, as shown in the cross-sectional view of FIG. 3, a composite material can include a plastic core 38 and metal skins 40, 42 coupled to opposing sides of the plastic core 38, making the composite material rigid but lightweight and durable. In one application, each panel member 28 may be made of a DURAPLATE® composite panel provided by Wabash National Corporation of Lafayette, Ind. In some instances, DURAPLATE® composite panel members 28 are constructed of a high-density polyethylene plastic core 38 bonded between two high-strength metal skins 40, 42.

The skins 40, 42 may be formed of a metal or metallic composition, examples of which include, but are not limited to aluminum, galvanized steel, full hardened steel, such as AISI Grade E steel, or the like. In one illustrative embodiment, for example, the outer skin 42 is formed of ASTM G90 galvanized steel, and the inner skin 40 is formed of ASTM G40 galvanized steel. In alternative embodiments, the inner and/or outer skins 40, 42 respectively may be formed of other rigid, semi-rigid, metallic or non-metallic materials. It should be understood that the term "inner skin" used herein may refer to a skin that faces inside the storage container 12, while the term "outer skin" used herein may refer to a skin that faces outside the storage container 12. Thus, with respect to the panel members 28 of the roof 20, the inner skin 40 may also be referred to as the bottom skin, while the outer skin 42 may also be referred to as the top skin. With respect to the panel members 38 of the walls 14, 16, 18, the inner skin 40 may also be referred to as the interior skin, while the outer skin 42 may also be referred to as the exterior skin.

Figure 4:
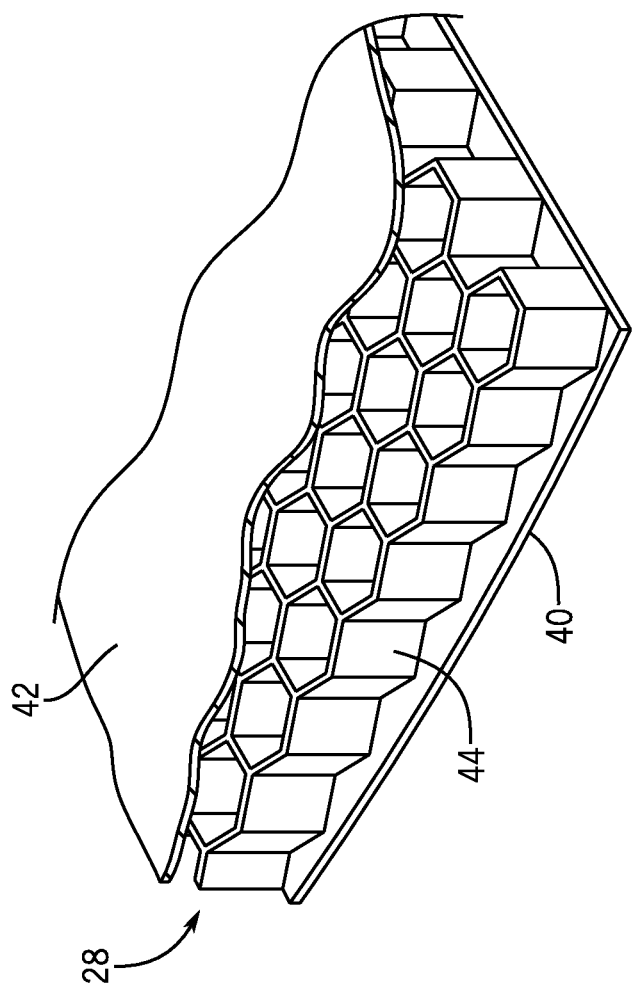
FIG. 4 is an isometric cutaway view of a panel member including a honeycomb core.

As described above, the core 38 may be a high-density polyethylene plastic core. In some embodiments, the core 38 may be approximately between 0.08 inch and 0.50 inch thick. In other applications, each panel member 28 may be made of a glass reinforced thermoplastic composite. Additionally, in some embodiments, other suitable composite materials may be used, including other types of inner cores 38. For example, FIG. 4 illustrates a panel member 28 with an inner skin 40, an outer skin 42, and a honeycomb core 44. More specifically, rather than the substantially solid high-density core 38 described with respect to FIG. 3, the honeycomb core 44 of FIG. 4 may include core material arranged in a honeycomb pattern.

Illustratively, adjacent panel members 28 may be coupled together at joints 45, such as shiplap joints, as shown in FIGS. 1 and 2. More specifically, shiplap joints 45 are formed by at least one edge of a first panel member 28 extending outward and overlapping a skin 40, 42 of a second, adjacent panel member 28.

Figure 5:
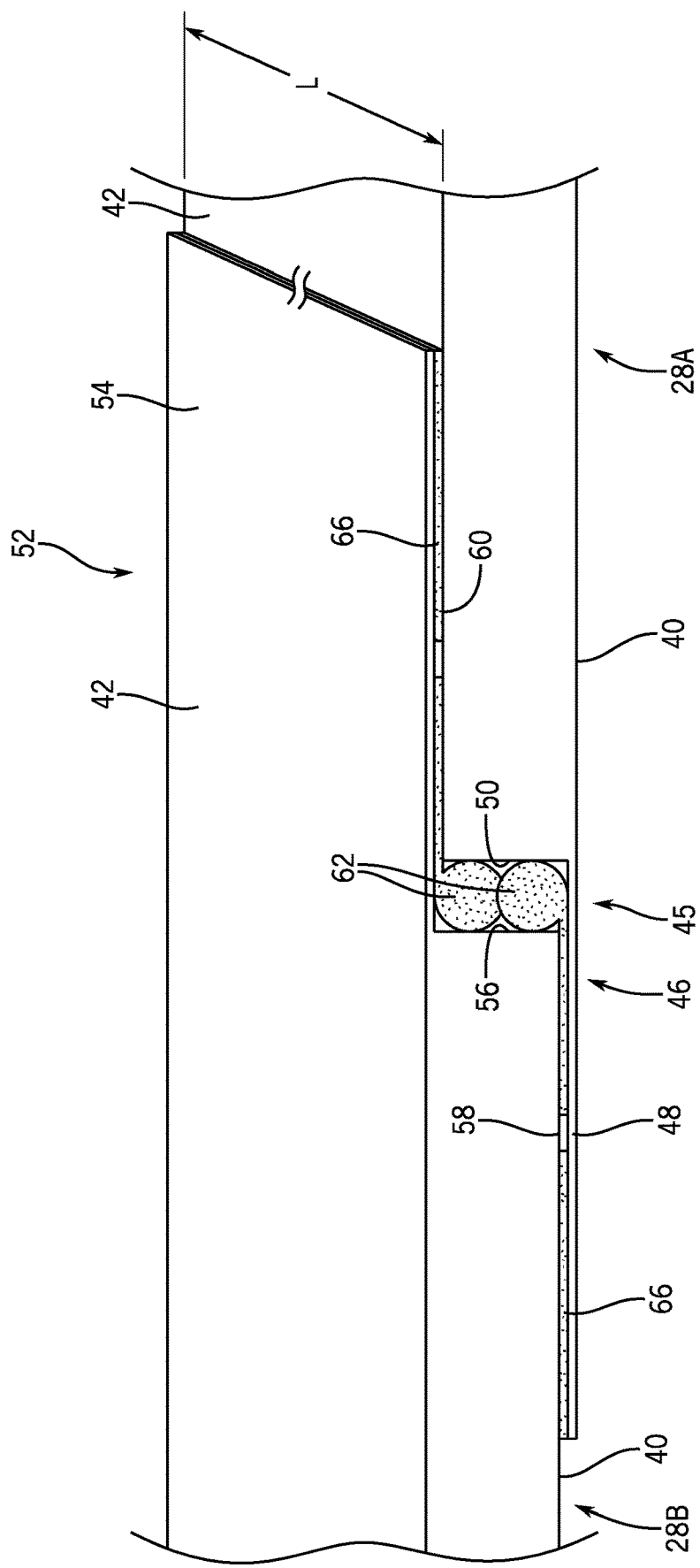
FIG. 5 is a top isometric schematic view of a shiplap joint according to the present invention.

For example, as shown in FIG. 5, a panel member 28A may include a first end 46, where the inner skin 40 includes a trailing edge 48 that extends beyond a side 50 of the first end 46 (the side 50 being defined by terminal edges of the core 38/44 (FIGS. 3 and 4) and outer skin 42). A panel member 28B may include an opposite second end 52, where the outer skin 42 includes a leading edge 54 that extends outwardly beyond a side 56 of the second end 52 (the side 56 being defined by the terminal edges of the core 38/44 and inner skin 40). As shown in FIG. 5, a shiplap joint 45 is formed by the trailing edge 48 of the first panel member 28A overlapping a portion 58 of the inner skin 40 of the adjacent, second panel member 28B. The shiplap joint 45 may also include the leading edge 54 of the second panel member 28B overlapping a portion 60 of the outer skin 42 of the first panel member 28A. Also, while the trailing edge 48 and the leading edge 54 are shown and described herein as being part of the inner skin 40 and the outer skin 42, respectively, it is within the scope of this disclosure to include the trailing edge 48 and the leading edge 54 on the outer skin 42 and the inner skin 40, respectively.

The overlapped portion 58 of the inner skin 40 (as shown in FIG. 5) and/or the overlapped portion 60 of the outer skin 42 are shown in FIG. 5. A structural adhesive 62 may be applied to the trailing edge 48 of the inner skin 49, the leading edge 54 of the outer skin 42, and within the area defined between the side 50 of the first end 46 and the side 56 of the second end 52.

An adhesive tape may be provided in the form of a viscoelastic tape 66. The viscoelastic tape 66 may be a very high bond (VHB) adhesive tape. The viscoelastic tape 66 may be applied to the trailing edge 48 of the inner skin 40 and to the leading edge 54 of the outer skin 42 distally from the structural adhesive 62. The viscoelastic tape 66 can have a thickness of about 0.015 in (0.4 mm). Additionally, or alternatively, the viscoelastic tape 66 can have a thickness substantially equal to the wet-out thickness of the structural adhesive 62 in the areas between the edges 48, 54 and the skins 40, 42 and may have an open cell or a closed cell structure. Further, the viscoelastic tape 66 may have a T-peel value of at least 20 pounds per linear inch. A non-limiting example of a viscoelastic tape 66 contemplated for use in the present invention is 3M™ VHB™ Tape 4926.

The viscoelastic tape 66 is designed to adhere the edges 48, 54 to the skins 40, 42, which acts as an attachment mechanism while the structural adhesive 62 sets. In some instances. the viscoelastic tape 66 extends along the entire length L of the panels 28 and acts as a damming mechanism to prevent the structural adhesive 62 between the edges 48, 54 and the skins 40, 42 from exiting the shiplap joint 45. In other instances, the viscoelastic tape 66 may be provided along only a portion of the panels 28 and/or provided along a top and/or bottom edge of the panels 28.

Figure 6:
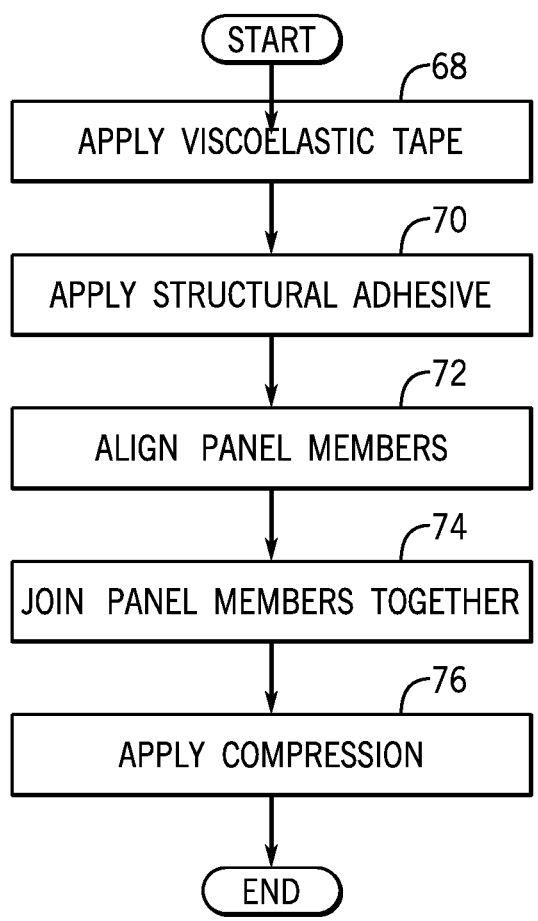
FIG. 6 is a joining method according to the present invention.

FIG. 6 illustrates a method of joining adjacent panel members 28 having structural adhesive 62 and viscoelastic tape 66 applied thereto. First, at step 68, viscoelastic tape is applied to the distal area of the trailing edge 48 of a first panel 28A along the length L of the first panel 28A, and viscoelastic tape is applied to the distal area of the leading edge 54 of a second panel 28B along the length L of the second panel 28B. Second, at step 70, an adhesive 62 or bonding material is applied to the trailing edge 48 and the overlapped portion 60 of a first panel member 28A. Next, at step 72, a second panel member 28B is positioned over or relative to the first panel member 28A to align the trailing edge 48 with the overlapped portion 58 and the leading edge 56 with the overlapped portion 60. At step 74, the panel members 28 are joined together. Once joined together, at step 76, compression is applied to both panel members 28 against either end of the joint (e.g., against the skins 40, 42 and the edges 48, 56). Preferably, at least 15 pounds of pressure is applied to the panels to adhere the panels together with the viscoelastic tape 66. The pressure may be applied with a hand roller or by any other known method in the art, for a duration long enough to activate the tape, after which the pressure may be removed. Because the viscoelastic tape 66 adheres the edges 48, 54 to the skins 40, 42, the structural adhesive 62 is able to fully set without further force being applied or clamping. The compression (at step 76) causes the adhesive 62 to spread, allowing the edges 48, 54 to be bonded to the respective skins 40, 42 substantially along the length L of panels 28A, 28B. In other words, the compression (i.e., the applied pressure) leaves the edges 48, 54 in skin-to-skin contact with the respective skins 40, 42. The viscoelastic tape 66 prevents the adhesive 62 from squeezing out past the edges 48, 54. By allowing skin-to-skin contact all the way to the end of the edges 48, 54 (i.e., to a seam between the edges 48, 54 and the skins 40, 42) and preventing adhesive squeeze-out, the viscoelastic tape 66 ensures a substantially tight edge and a substantially smooth transition from one panel member 28A to the next panel member 28B to help prevent an object from snagging one of the edges 48, 54. The viscoelastic tape 66 also aids in preventing water from entering the joint 45.

The above-described viscoelastic tape 66 and method can be applied to multiple types of panel members 28. For example, both the DURAPLATE® composite panel members 28 of FIG. 3 and the honeycomb composite panel members 28 of FIG. 4 can include viscoelastic tape 66 and can be joined using the method of FIG. 6.

Accordingly, embodiments of the invention provide panel members of walls and/or a roof of a storage container joined together by shiplap joints and methods utilizing viscoelastic tape 66 and structural adhesive 62. These shiplap joints and methods provide smooth, snag-resistant edges between adjacent panel members and can be used with different types of panel member structures.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. Furthermore, it will be understood that the embodiments discussed above are presented as examples only, and that other embodiments are possible.

The description herein of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A storage container comprising:
   a roof; and
   two opposing side walls;
   wherein at least one of the roof and the two opposing side walls comprises:
   a first panel member with a first panel member length, the first panel member including:
   an inner skin defining a first surface,
   an outer skin,
   a core between the inner skin and the outer skin,
   an inner skin trailing edge extending beyond the core and the outer skin and extending along the first panel member length, the inner skin trailing edge defining a second surface, and
   a first viscoelastic tape extending along a distal area of the inner skin trailing edge,
   wherein the first surface is coextensive with the second surface,.
   a second panel member with a second panel member length and an inner skin, the inner skin trailing edge of the first panel member overlapping an overlapped portion of the inner skin of the second panel member, with the first viscoelastic tape in contact with the overlapped portion of the inner skin of the second panel member, and
   an adhesive material applied between the inner skin trailing edge of the first panel member and the inner skin of the second panel member, wherein the first viscoelastic tape is located distally from the adhesive material along the inner skin trailing edge.

2. The storage container of claim 1, wherein the first panel member further includes:
- an outer skin leading edge, opposite the inner skin trailing edge, extending beyond the core and the inner skin and extending along the first panel member length, and
- a second viscoelastic tape extending along a distal area of the outer skin leading edge.

3. The storage container of claim 1, wherein the first viscoelastic tape of the first panel member is configured to retain the first panel member and the second panel member while the adhesive material sets.

4. The storage container of claim 1, wherein the first viscoelastic tape of the first panel member is configured to prevent the adhesive material from extending beyond the inner skin trailing edge of the first panel member and the overlapped portion of the inner skin of the second panel member.

5. The storage container of claim 1, wherein the second panel member further includes:
- an outer skin,
- a core between the inner skin and the outer skin,
- an outer skin leading edge extending beyond the core and the inner skin and extending along the second panel member length, and
- a first viscoelastic tape extending along a distal area of the outer skin leading edge.

6. The storage container of claim 5, wherein the second panel member further includes:
- an inner skin trailing edge, opposite the outer skin leading edge, extending beyond the core and the outer skin and extending along the second panel member length, and
- a second viscoelastic tape extending along a distal area of the inner skin trailing edge.

7. The storage container of claim 5, wherein the outer skin leading edge of the second panel overlaps an overlapped portion of the outer skin of the first panel member, with the first viscoelastic tape of the second panel member in contact with the overlapped portion of the outer skin of the first panel member.

8. The storage container of claim 7, wherein an adhesive material is applied between the outer skin leading edge of the second panel member and the outer skin of the first panel member.

9. A panel member of a storage container, the panel member comprising:
- a panel member length;
- an inner skin;
- an outer skin;
- a core between the inner skin and the outer skin;
- an inner skin trailing edge extending beyond a terminal edge of the core and the outer skin and extending along the panel member length,
- a first viscoelastic tape extending along a distal area of the inner skin trailing edge; and
- a structural adhesive applied adjacent to the terminal edge of the core,
- wherein the first viscoelastic tape is located distally from the structural adhesive along the inner skin trailing edge.

10. The panel member of claim 9, wherein the first viscoelastic tape extends the entire panel member length.

11. The panel member of claim 9, wherein the inner skin defines a third surface and the inner skin trailing edge defines a fourth surface, and wherein the third surface is coextensive with the fourth surface.

12. The panel member of claim 9, wherein the first viscoelastic tape has a T-peel value of at least 20 pound per linear inch.

13. The panel member of claim 9, wherein the first viscoelastic tape has an open cell structure.

14. The panel member of claim 9, wherein the first viscoelastic tape has a closed cell structure.

15. The panel member of claim 9, wherein the first viscoelastic tape has a thickness substantially equal to a wet-out thickness of the structural adhesive used to bond two or more panel members together.

16. The panel member of claim 9 further comprising:
- an outer skin leading edge, opposite the inner skin trailing edge, extending beyond the core and the inner skin and extending along the panel member length, and
- a second viscoelastic tape extending along a distal area of the outer skin leading edge.

17. A method of joining together a first panel member and a second panel member of a storage container, the method comprising:
- applying a viscoelastic tape to distal portions of an inner skin trailing edge of a first panel member along a first panel length and an outer skin leading edge of a second panel member along a second panel length, wherein the first panel member and the second panel member each comprises an inner skin and an outer skin, and wherein the inner skin of the first panel member includes the inner skin trailing edge and the outer skin of the second panel member includes the outer skin leading edge;
- applying an adhesive material to the inner skin trailing edge of the first panel member and the outer skin leading edge of the second panel member inward from the distal portions thereof;
- aligning the inner skin trailing edge of the first panel member with an inner skin overlapped portion of the inner skin of the second panel member and the outer skin leading edge of the second panel member with an outer skin overlapped portion of the outer skin of the first panel member;
- joining together the first panel member and the second panel member so that the inner skin trailing edge of the first panel member extends over the inner skin overlapped portion of the inner skin of the second panel member and the outer skin leading edge of the second panel member extends over the outer skin overlapped portion of the outer skin of the first panel member; and
- applying a compressive force to the first panel member and the second panel member to spread the adhesive material across the inner skin trailing edge substantially along the first panel length of the first panel member and across the outer skin leading edge substantially along the second panel length of the second panel member, wherein the viscoelastic tape prevents the adhesive material from squeezing out past the inner skin trailing edge and the outer skin leading edge.

18. The method of claim 17, and further comprising retaining contact between the first panel member and the second panel member using the viscoelastic tape while the adhesive material sets.

* * * * *